Patented Jan. 17, 1950

2,494,817

UNITED STATES PATENT OFFICE 2,494,817

BROMINATION OF TRIFLUOROMETHYL DERIVATIVES OF BENZENE

Charles F. Kohl, Jr., Pittsburgh, Pa., assignor to Corning Glass Works, Corning, N. Y., a corporation of New York No Drawing. Application November 18, 1947, Serial No. 786,807

3 Claims. (Cl. 260—651)

The present invention relates to the preparation of bromine derivatives of trifluoromethyl substituted benzene.

The bromination of trifluoromethyl substituted benzene has been described by Simons and Ramler in 1943 in the Journal of the American Chemical Society, volume 65, page 389. In accordance with the method described by them, the bromination is effected in liquid phase at 60° C. using iron powder as a catalyst. They indicated that the compounds obtained were exclusively those in which the bromine was in meta position.

Objects of the present invention are to provide improved methods for effecting this bromination.

In accordance with the present invention bromine is reacted with materials of the class consisting of trifluorotoluene and hexafluoroxylene in which the fluorine atoms are bonded to the carbon atoms of the side chains. The reaction is effected by passing a mixture of the fluorohydrocarbon and bromine in vapor phase through a reactor at a temperature in the range of 700 to 900° C. By this method monobromo and dibromo derivatives are formed. The contact time is not critical in this operation. Complete bromination is effected at contact times under the conditions stated of 1.35 seconds and greater. At shorter contact times the reaction of the present process occurs but to a limited extent.

Any material may be used for the reactor which will maintain its physical form at the temperature employed for the reaction and which will resist corrosion by the bromine at this temperature. Suitable illustrative materials which may be employed for reactor construction are fused quartz, heat shrunk leached borosilicate glass and rare earth metals.

The following examples illustrate this invention:

Example 1

A mixture of trifluoromethylbenzene and bromine in relative proportion of 1.35 parts by weight of the benzene derivative per part of bromine was passed at a temperature of 800° C. through a tube of heat shrunk leached borosilicate glass. Initially the mixture was passed through the tube at a relatively low rate. Bromine consumption was complete. The rate was increased to a high rate, at which unreacted bromine was contained in the effluent from the tube together with brominated products. The rate was then reduced just to the point at which bromine was entirely consumed. At this point the contact time was 1.35 seconds. None of the fluorine was removed from the trifluoromethylbenzene or its bromine derivative. This is in contrast to the liquid phase bromination in which 38% of the trifluorotoluene is lost in the form of benzoic acid which must be separated by steam distillation from the brominated product. The brominated product was washed, first with sodium bisulfite to remove any residual bromine and then with sodium hydroxide solution to remove the hydrogen bromide. The product so purified was then distilled to separate the various bromine derivatives. The following materials were obtained:

|  | BP °C. | $D_{25}$ | $\eta D_{27}$ |
|---|---|---|---|
| o-$CF_3C_6H_4Br$ | 170.6–171.6@740 mm | 1.664 | 1.4811 |
| m-$CF_3C_6H_4Br$ | 155@740 mm | 1.623 | 1.4712 |
| $CF_3C_6H_3$, $4Br_2$ | 205–207.8@740 mm | 1.984 | 1.5190 |
| $CF_3C_6H_3Br_2$ | 111.1@25 mm | 2.004 | 1.5265 |
| $CBrF_2C_6H_4Br$ | 146–148@25 mm | 1.969 | 1.5385 |

The distillation curve indicated the presence of some p-$CF_3C_6H_4Br$. The positions of the bromine in the 4th compound were not determined but are probably in the 3 and 5 positions. This bromination was likewise effected at other temperatures with similar results. The temperatures found to be effective ranged from 700° C., to around 900° C. where mechanical difficulties were encountered.

Example 2

A mixture of meta and para bistrifluoromethyl benzenes and bromine was prepared by saturating the xylene hexafluoride with bromine at room temperature. The saturated solution was then vaporized and the vapors passed through a tube heated to 800° C. as in Example 1. The product was purified and distilled as in Example 1. The following compounds were obtained.

|  | BP °C. | $D_{25}$ | $\eta D_{27}$ |
|---|---|---|---|
| 1,3 $(CF_3)_2C_6H_3 5Br$ | 152@740 mm | 1.726 | 1.4248 |
| 1,3 $(CF_3)_2C_6H_3 4Br$ | 158@740 mm |  | 1.4295 |
| 1,4 $(CF_3)_2 C_6H_3 2Br$ | 161.8@740 mm | 1.743 | 1.4323 |
| $(CF_3)_2C_6H_2Br_2$ | 101.6@23 mm | 2.022 | 1.4775 |
| $(CF_3)_2C_6H_2Br_2$ | 105.2–106.9@23 mm | 1.997 | 1.4761 |

The identity with respect to positioning of the last two compounds in the above table has not been determined.

The compounds described in the above examples are of utility for the preparation of Grignard reagents which are useful in preparing derivatives of the trifluoromethylbenzenes.

That which is claimed is:

1. The method of brominating trifluoromethyl derivatives of benzene which comprises reacting a trifluoromethyl derivative of benzene with bromine at a temperature between 700 and 900° C. in vapor phase.

2. The method of preparing trifluoromethylphenyl bromide which comprises reacting trifluoromethylbenzene with bromine at a temperature between 700 and 900° C. in vapor phase.

3. The method of preparing bistrifluoromethylphenylbromide which comprises reacting bis(trifluoromethyl) benzene with bromine at a temperature between 700 and 900° C. in vapor phase.

CHARLES F. KOHL, Jr.

REFERENCES CITED

The following references are of record in the file of this patent:

UNITED STATES PATENTS

| Number | Name | Date |
|---|---|---|
| 2,095,275 | Wibaut et al. | Oct. 12, 1937 |

OTHER REFERENCES

Simons et al.: Jour. Am. Chem. Soc., vol. 65, 389–392 (1943).